US005793435A

United States Patent [19]
Ward et al.

[11] Patent Number: 5,793,435
[45] Date of Patent: Aug. 11, 1998

[54] DEINTERLACING OF VIDEO USING A VARIABLE COEFFICIENT SPATIO-TEMPORAL FILTER

[75] Inventors: Benjamin A. Ward, Portland; T. Naveen, Beaverton, both of Oreg.

[73] Assignee: Tektronix, Inc., Wilsonville, Oreg.

[21] Appl. No.: 670,041

[22] Filed: Jun. 25, 1996

[51] Int. Cl.⁶ .............................. H04N 7/01; H04N 11/20
[52] U.S. Cl. ........................ 348/448; 348/441; 348/443; 348/458
[58] Field of Search .................... 348/448, 443, 348/441, 449, 451, 452, 458; H04N 7/01, 11/20

[56] References Cited

U.S. PATENT DOCUMENTS

| | | | |
|---|---|---|---|
| 4,636,857 | 1/1987 | Achiha et al. | 348/448 |
| 5,351,087 | 9/1994 | Christopher et al. | 348/441 |
| 5,471,249 | 11/1995 | Monta et al. | 348/458 |
| 5,475,437 | 12/1995 | Song | 348/448 |
| 5,488,421 | 1/1996 | Hwang et al. | 348/448 |

Primary Examiner—Mark R. Powell
Assistant Examiner—Vivek Srivastara
Attorney, Agent, or Firm—Francis I. Gray

[57] ABSTRACT

A variable coefficient, non-separable spatio-temporal interpolation filter is used to deinterlace an interlaced video signal to produce a progressive video signal. The interlaced video signal is input to a video memory which in turn provides a reference and plurality of offset video signals representing the pixel being interpolated and spatially and temporally neighboring pixels. A coefficient index, transmitted with the interlaced video as an auxiliary signal, or derived from motion vectors transmitted with the interlaced video, or derived directly from the interlaced video signal, is applied to a coefficient memory to select a set of filter coefficients. The reference and offset video signals are weighted together with the filter coefficients in the spatio-temporal interpolation filter, such as a FIR filter, to produce an interpolated video signal. The interpolated video signal is interleaved with the reference video signal, suitably delayed to compensate for filter processing time, to produce the progressive video signal.

5 Claims, 2 Drawing Sheets

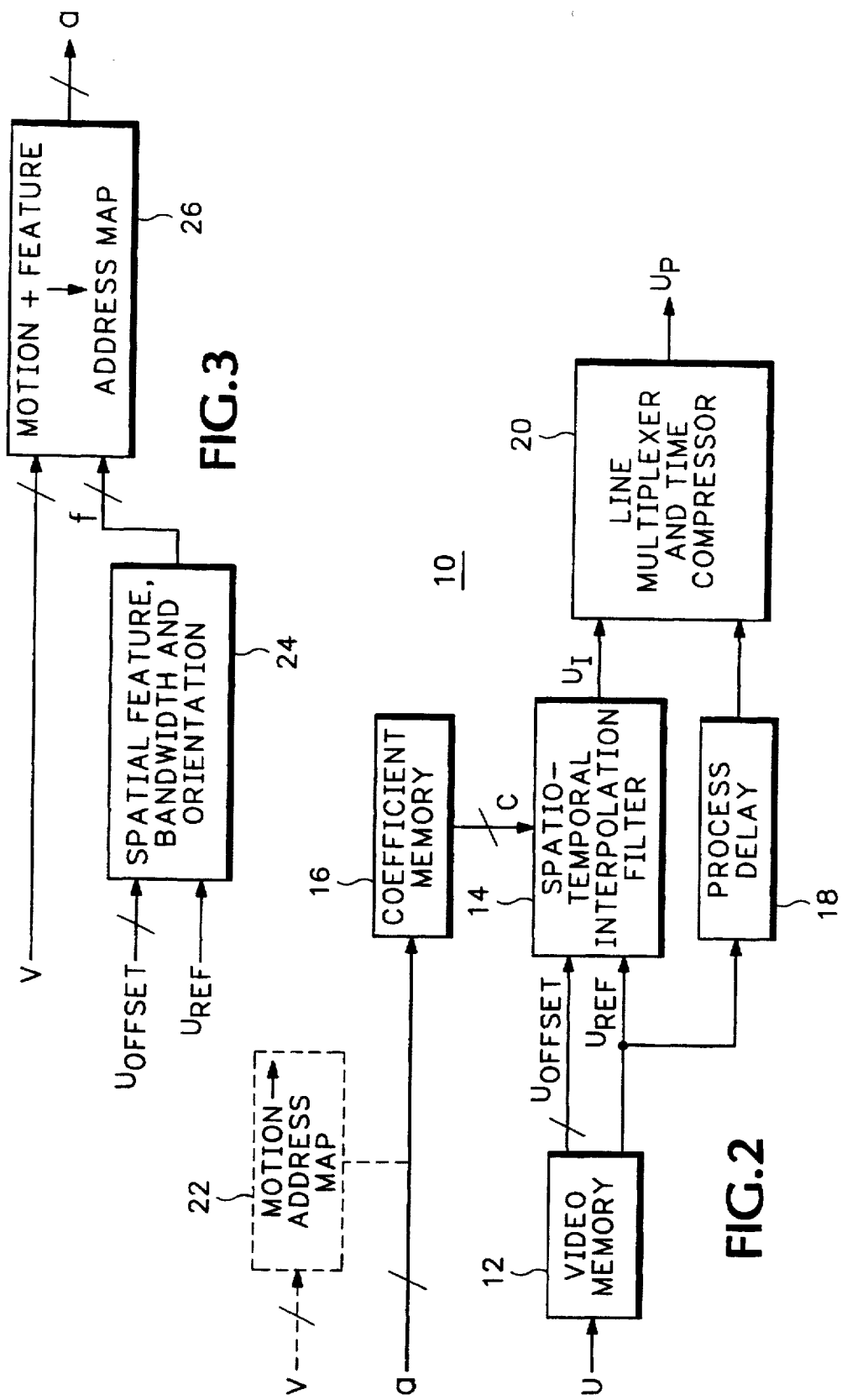

DEINTERLACING OF VIDEO USING A VARIABLE COEFFICIENT SPATIO-TEMPORAL FILTER

BACKGROUND OF THE INVENTION

The present invention relates to processing of video signals, and more particularly to the conversion of interlaced video formats into progressive video formats using a variable coefficient spatio-temporal filter.

A motion video sequence provides a sequence of still images, as in motion picture film, each image being referred to as a frame. Each image is defined by the number of scan lines on a display required to present the complete image. Progressive video contains the full complement of scan lines for each frame of the motion video sequence. Interlaced video alternately groups either odd or even scan lines into consecutive fields of the motion video sequence so that a pair of fields in interlaced video constitutes a frame, i.e., one full resolution picture. Most current television video standards use the interlaced video format. For example the NTSC video standard uses 525 lines per frame, 262½ lines per video field, at a rate of approximately 30 frames per second (approximately 60 fields per second).

Deinterlacing, the process of converting interlaced video to progressive video, requires calculating and reinserting either the odd or even scan line picture elements (pixels) that are dropped from alternate fields of interlaced video. This process is generally referred to as line interpolation. To make the frame rate of the deinterlaced video the same as the field rate of the interlaced video, the line rate is doubled so that the frame rate becomes approximately 60 frames per second for NTSC. Line rates are doubled by doubling the output sample clock for both the original and interpolated lines, also known as time compressing, i.e., doubling the rate at which lines are scanned on the display.

Progressive video is desirable for many reasons. Progressive displays have fewer visual artifacts, such as line crawl on diagonal edges of the image and twitter on horizontal edges of the image. Tasks, such as frame rate conversion, spatial scalability (picture zooming) and digital special effects, are simpler with progressive video. Thus converting interlaced video to progressive video is a desirable objective.

Many interpolation methods have been proposed for video deinterlacing. A classical method of integer factor interpolation uses a linear shift-invariant (LSI) filter. Functionally the interpolation is implemented by first creating an augmented field sequence with lines containing zero valued pixels inserted between alternate lines of original video. The augmented field sequence is then "smoothed" out with a one-, two- or three-dimensional LSI filter. The "smoothing" replaces zero valued pixels with weighted sums of surrounding pixels. The "smoothing" may or may not affect the original pixel values. Practically, interpolation by zero insertion with filtering is inefficient and generally is not implemented in that manner. Different interpolation filters work better under different conditions.

A static picture is unchanged along the temporal direction and so contains on a DC term in the temporal spectrum. A zero padded static picture has a repeat spectrum at the temporal Nyquist frequency only, i.e., 120 Hz. A simple temporal filter that adds like pairs of consecutive fields (field merging) interpolates a motionless picture sequence perfectly. When a picture sequence contains moving objects or the scene is being panned, field merging may cause visual artifacts. For instance, suppose a picture sequence contains an object with a vertical edge moving in a horizontal direction. Deinterlacing by field merging (temporal only interpolation) produces a comb effect along the moving edge of the object. A strictly vertical filter, such as an average of the pixels above and below the interpolated pixel from the same field, does not have this artifact. However the same vertical filter (spatial only interpolation) yields lower vertical resolution for still pictures than does field merging. A video sequence typically contains both characteristics, that of objects in motion and of static pictures, either in different regions of the field or at different times in the field sequence. A filter that spans pixels in the temporal and vertical directions, and varies according to local motion content, constitutes a better compromise between the above mentioned temporal and spatial approaches.

To improve upon the LSI filter approach, many adaptive interpolation techniques have been proposed. One mode of adaptation is based upon motion detection, as described in "The Sampling and Reconstruction of Time-Varying Imagery with Application in Video Systems" by E. Dubois, Proceedings of the IEEE, Vol. 73, No. 4, pp. 502–522, April 1985. The purpose of motion-adaptive interpolation is to vary the effective interpolation filter as a function of a measure of motion local to the pixel being interpolated. Most implementations of motion-adaptive interpolation systems are similar to that described in U.S. Pat. No. 5,260,786 and shown in FIG. 1. The basic idea is to provide for an input video signal, U, temporal interpolation, Ut, in motionless areas of the video sequence and spatial interpolation, Us, in areas with motion. The presence and level of motion, M, in the picture sequence is detected to generate a weighting factor, $\beta$, with a value between 0 (no motion) and 1 (significant motion). A weighted sum, using the weighting factor, between the spatial and temporal interpolations of the interlaced video is determined to produce an interpolated video, $Ui=\beta Us+(1-\beta)Ut$. The interpolated video and interlaced video are line multiplexed and time compressed to provide progressive video, Up, at double the line rate of the interlaced video.

Motion detection forms a critical component of the adaptive interpolation scheme described above. Most proposed motion detection schemes depend on inter-frame luminance differences in the neighborhood of the pixel being interpolated. When the luminance difference is "low", i.e., $\beta$ is small, the measure of motion is small, and when the luminance difference is "high", i.e., $\beta$ is high, greater motion is assumed. The direction of motion is not detected by these schemes. Mechanisms for detecting horizontal edges, i.e., vertical luminance steps, have been included in some motion adaptive interpolation systems, as described in U.S. Pat. Nos. 4,947,251 and 5,051,826. When spatial interpolation is dominated by vertical filtering, it has more impact on horizontally oriented edges than on vertically oriented edges, which have a lower vertical bandwidth. Thus the presence of horizontal edges causes the motion detector output $\beta$ to shift as a function of delta luminance such that a greater amount of motion is required to shift from temporal filtering to spatial filtering.

There are other variations on the adaptive interpolation scheme of FIG. 1. One scheme, as disclosed by Y. Wang, S. K. Mitra in "Motion/Pattern Adaptive Interpolation of Interlaced Video Sequences" ICASSP, 1991, Toronto Canada, pps. 2829–2832, proposes using a spatially adaptive filter for spatial interpolation. Another scheme, as disclosed by K. Jensen, D. Anastassiou in "Digitally Assisted Deinterlacing for EDTV" IEEE Transactions on Circuits and Systems for Video Technology, Vol. 3, No. 2, April 1993, is similar in principal to the adaptive interpolation of FIG. 1, but instead uses auxiliary information transmitted with the interlaced video to direct the interpolation process at the receiver. In this latter scheme motion vectors are sent on a block by block basis for a two field motion compensated interpolation function. This is done for both forward and backward directions. Additional information is sent on a per block basis that dictates what filter or combination of filters with either of the motion compensation methods is used for deinterlacing a particular block. The five choices are (1) forward or (2) backward motion compensated interpolation; (3) strictly spatial interpolation; or (4&5) an average of option (3) with options (1&2) respectively.

All of the above-described interpolation filters have a common characteristic—they are composed of separate spatial and temporal domain filters. What is desired is to provide a non-separable, variable coefficient spatio-temporal filter for deinterlacing video that approximates filtering along a spatio-temporal path of least color change, which is frequently along an object's line of motion within the interlaced video.

SUMMARY OF THE INVENTION

Accordingly the present invention provides for deinterlacing interlaced video to produce progressive video using a variable coefficient spatio-temporal filter. An interlaced video signal is input to a video memory which in turn outputs a reference delay signal, corresponding to the pixel being interpolated, and a set of offset delay signals, corresponding to neighbors of the pixel being interpolated both spatially and temporally. A coefficient index signal, which may be transmitted as auxiliary data with the interlaced video signal, which may be motion vectors accompanying the interlaced video data, or which may be calculated from the interlaced video data, is input to a coefficient memory to select a set of filter coefficients. The reference and offset delay signals and the selected set of filter coefficients are input to a spatial-temporal interpolation filter, such as a FIR filter, where the input signals are weighted together as a function of the set of filter coefficients to produce an interpolated video signal. The interpolated video signal is input to a line multiplexer and time compressor for combination with the reference delay signal which has been further delayed to compensate for the processing time of the filter. The output from the line multiplexer and time compressor is a progressive video signal at twice the frame rate of the interlaced video signal. The combination of the coefficient index signal and the sets of coefficients result in lowpass filtering the interlaced video signal approximately along the direction of motion or minimum color change for each pixel.

The objects, advantages and other novel features of the present invention are apparent from the following detailed description when read in conjunction with the appended claims and attached drawing.

BRIEF DESCRIPTION OF THE DRAWING

FIG. 2 is a block diagram view of a variable coefficient spatio-temporal filter for a deinterlacing system according to the present invention.

FIG. 3 is a block diagram view of a coefficient index signal generator for the deinterlacing system according to the present invention.

DESCRIPTION OF THE PREFERRED EMBODIMENT

Figure 1:
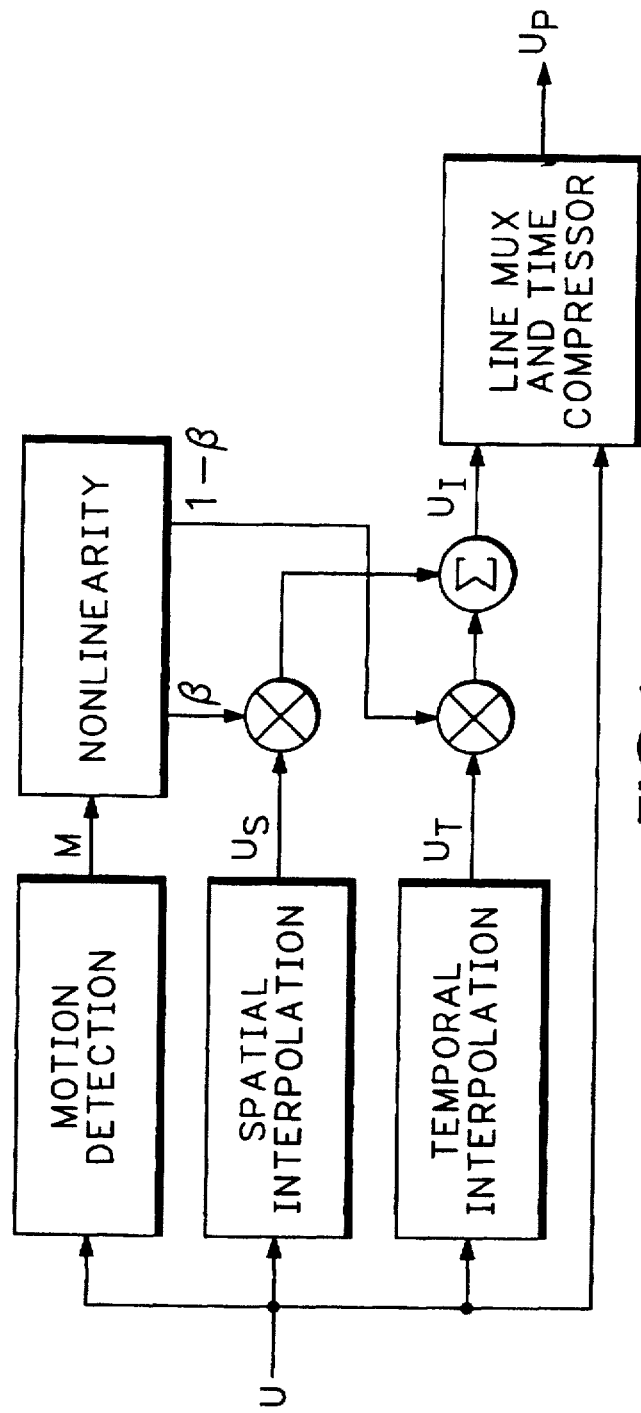
FIG. 1 is a block diagram view of a two-dimensional adaptive interpolation filter according to the prior art.

Unlike the filter methods mentioned above, a non-separable, spatio-temporal linear filter is used for deinterlacing interlaced video. The spatio-temporal filter calculates new pixel values from a weighted sum of pixel values in the vertical, horizontal and temporal directions from the interpolated pixel location in order to filter as closely as possible and practical along the direction of motion or minimum color change for the interpolated pixels. Also the filter is spatially and temporally varying, which means a different set of filter coefficients may be used for the interpolation point. Having coefficients that may be altered dynamically allows the interpolation to be tailored to the local motion and spatial characteristics in the video sequence. Filter coefficients may be changed as often as once for each interpolated pixel, or may be changed less often.

Referring now to FIG. 2 a deinterlacing system 10 has two inputs—the interlaced video, U, and a coefficient index signal, a. The interlaced video is input to a video memory 12 which produces a reference delay output, Uref, i.e., the pixel just below the pixel being interpolated, for each interpolated pixel and a set of offset delay outputs, Uoffset, which are spatially and temporally neighboring pixels. All video outputs from the video memory 12 are delayed by different combinations of field, line and pixel sample intervals to produce the reference and offset delay outputs. Relative to Uref the video outputs Uoffset are offset different line and field periods and pixel sample intervals, which provides a spatio-temporal interpolation filter 14, such as a FIR filter that outputs a weighted average of the inputs according to selected coefficients, with simultaneous access to multiple video lines and pixels in the spatio-temporal neighborhood of a pixel being interpolated. The spatio-temporal interpolation filter 14 calculates a weighted sum of the video signals, Uref and Uoffset, i.e., convolutes the local video signal with filter coefficients, c, to produce an interpolated video, Ui. The coefficient index signal, a, selects a set of coefficients, c, from a coefficient memory 16 for each interpolated pixel or block of pixels. Before merging the reference and interpolated videos into a progressive video, Up, the reference video is delayed in a process delay circuit 18 by an amount equal to the process delay of the spatio-temporal interpolation filter 14. Finally the delayed reference and interpolated videos are line multiplexed and time compressed in an appropriate circuit 20 to yield the progressive, deinterlaced video. Such a circuit 20 may clock Ui and Uref into parallel FIFOs at the line rate of U, and then alternately dump one line worth of first Uref and then Ui to Up at the line rate of Up.

The coefficient index signal may be derived by several means. The index signal may be an auxiliary part of the interlaced video signal, i.e., a video source may contain auxiliary information specifying the index for each pixel. Such a scheme has been proposed as part of the spatial scalability procedure for MPEG, a format for compressed and coded digital video. One or more bits in a header for each frame are devoted to the selection of deinterlacing filter coefficient indices.

Another method of generating the coefficient index signal relies on motion information accompanying the interlaced video signal. Motion information is used to select a set of interpolation filter coefficients that provide a low pass function along the direction of motion. For example for static picture sequences, i.e., no motion, the filter 14 reduces to a lowpass filter in the temporal dimension, such as in the prior art field merging. An example of source based motion information is the MPEG2 video stream that may contain block motion vectors used in encoding and decoding compressed digital video. Each velocity, or motion, vector, V, is mapped to a specific coefficient memory index to produce the index signal via a lookup table 22 or similar mechanism. In an MPEG2 video stream there may be a velocity vector associated with each 16×8 or 16×16 block of pixels. Other video formats may have velocity vectors for different pixel grouping schemes.

A variant on the velocity to address mapping scheme described above is to have the velocity vectors calculated at the interpolator rather than the video source. The local velocity estimation method may be a block motion estimation technique, such as that in MPEG2, or may be based on some other technique.

Another coefficient index signal generation scheme is shown in FIG. 3. The generation of the index signal is based on both velocity vector information and information on the presence and orientation of high bandwidth features, such as lines, edges (luminance/chrominance steps) or fine patterns. Spatial feature information is derived in a spatial feature bandwidth and orientation block 24 from the offset and reference delay outputs to produce a feature vector, f. The feature vector may be the orientation of the most prominent local features and the spatial bandwidth, relative to a threshold, along that orientation and orthogonal to that orientation. Feature bandwidth and orientation may be derived in the spatial domain from two or more directional highpass filters. The filters may be preceded by a high differentiator, i.e., two point difference, for edge detection. The equivalent information may be derived in the frequency domain from a "short space", analogous to short time, two dimensional Fourier transform of the pixels local to the pixel being interpolated. The magnitude spectrum is searched for the highest frequency spectral component, its direction and the spectral bandwidth orthogonal to that direction. The combined vector of the motion and feature vectors is mapped to produce the coefficient index signal by a lookup table or the like 26. In other words, the direction of least amount of color change is determined.

Thus the present invention provides deinterlacing of an interlaced video to produce a progressive video using a non-separable, spatio-temporal interpolation filter with variable coefficients based upon local motion local to the pixel being interpolated, and/or also based upon significant features within the interlaced video.

What is claimed is:

1. A deinterlacing system for converting an interlaced video to a progressive video comprising:

a video storage device having the interlaced video as an input and providing a plurality of offset videos and a reference video as outputs;

a non-separable, spatio-temporal interpolation filter having the reference and offset videos as inputs to produce an interpolated video according to variable coefficients representative of a direction of motion or minimum color change within the interlaced video; and means for combining the interpolated video with the reference video to produce the progressive video.

2. The system as recited in claim 1 further comprising a coefficient storage device for storing the variable coefficients in the form of a plurality of sets of filter coefficients, each set being independently accessible in response to an index signal to provide the variable coefficients to the spatio-temporal interpolation filter.

3. The system as recited in claim 2 further comprising means for generating the index signal as a function of motion vectors associated with the interlaced video.

4. The system as recited in claim 3 wherein the index signal generating means comprises a lookup table containing index values, the lookup table providing the index values as the index signal in response to the motion vectors.

5. The system as recited in claim 3 wherein the index signal generating means comprises:

means for determining a feature vector from the offset and reference videos; and means for producing the index signal in response to the feature vector and the motion vectors.

* * * * *